(12) United States Patent
Chang

(10) Patent No.: US 8,769,309 B2
(45) Date of Patent: Jul. 1, 2014

(54) FLASH MEMORY STORAGE SYSTEM, AND CONTROLLER AND METHOD FOR ANTI-FALSIFYING DATA THEREOF

(75) Inventor: Ching-Wen Chang, Hsinchu (TW)

(73) Assignee: Phison Electronics Corp., Miaoli (TW)

( * ) Notice: Subject to any disclaimer, the term of this patent is extended or adjusted under 35 U.S.C. 154(b) by 1166 days.

(21) Appl. No.: 12/371,820

(22) Filed: Feb. 16, 2009

(65) Prior Publication Data
US 2010/0146190 A1    Jun. 10, 2010

(30) Foreign Application Priority Data
Dec. 5, 2008   (TW) .............................. 97147393 A

(51) Int. Cl.
*G06F 12/14*   (2006.01)
(52) U.S. Cl.
USPC .............................. 713/193; 713/181; 726/26
(58) Field of Classification Search
USPC ......... 713/181, 168, 170, 172, 179, 185, 187,
713/193–194; 726/2, 20, 26–30; 380/243,
380/244, 246; 707/687, 689, 690, 694, 695,
707/696, 698, 824
See application file for complete search history.

(56) References Cited

U.S. PATENT DOCUMENTS

| | | | |
|---|---|---|---|
| 2003/0212894 A1* | 11/2003 | Buck et al. ..................... | 713/184 |
| 2006/0174067 A1* | 8/2006 | Soules et al. .................. | 711/135 |
| 2007/0226412 A1* | 9/2007 | Morino et al. ................ | 711/113 |
| 2007/0300007 A1* | 12/2007 | Bulusu et al. ................. | 711/103 |

* cited by examiner

*Primary Examiner* — Nirav B Patel
(74) *Attorney, Agent, or Firm* — J.C. Patents

(57) ABSTRACT

A flash memory storage system is provided. The flash memory storage system includes a controller having a rewritable non-volatile memory and a flash memory chip. The rewritable non-volatile memory stores a data token and the flash memory chip stores a security data and a message digest. When the security data in the flash memory chip is updated, the controller updates the data token and generates an eigenvalue, and updates the message digest according to the updated data token and the updated eigenvalue by using a one-way hash function, respectively. When the security data in the flash memory chip is processed by the controller, the controller determinates whether the security data is falsified according to the data token, the eigenvalue and the message digest. In such a way, the security data stored in the flash memory storage system can be effectively protected.

20 Claims, 3 Drawing Sheets

FLASH MEMORY STORAGE SYSTEM, AND CONTROLLER AND METHOD FOR ANTI-FALSIFYING DATA THEREOF

CROSS-REFERENCE TO RELATED APPLICATION

This application claims the priority benefit of Taiwan application serial no. 97147393, filed on Dec. 5, 2008. The entirety of the above-mentioned patent application is hereby incorporated by reference herein and made a part of specification.

BACKGROUND

1. Technology Field

The present invention generally relates to a flash memory storage system, and more particularly, to a flash memory storage system with a function of anti-falsifying data, and a flash memory controller and a method for anti-falsifying data thereof.

2. Description of Related Art

Users have been gradually used to electronic purse (e-purse) and prepayment. Correspondingly, smart cards have been more and more widely used. A typical smart card is an integrated circuit (IC) chip allowing the user to executing a certain operation as predetermined. Such a smart card usually includes a microprocessor, a card operation system, a security module, and a memory unit. The smart card is adapted for providing calculation, encryption, two-way communication, and security functions, so that the smart card is capable of providing a protection to the data stored therein in addition to the function of saving the data. A subscriber identification module used in a GSM (global system for mobile communication) cellular phone is an exemplified application of the smart card. Generally speaking, a smart card has very limited storage capacity due to the limited scales of ICs therein.

A memory card is a data storage equipment and which usually uses a NAND flash memory as its storage medium. A NAND flash memory is rewritable and erasable, and data stored in a NAND flash memory is retained even when no power is supplied to the NAND flash memory. In addition, along with the advancement of the fabricating technique, a NAND flash memory offers many other advantages, such as small volume, high access speed, and low power consumption, etc. Thus, in recent years, people in the industry have been trying to integrate smart card with large-capacity memory card in order to increase the storage capacity of smart card.

However, when a smart card and a memory card are integrated, security data is stored in the memory card but not in the original IC chip. Accordingly, how to ensure the security of data stored in the memory card is the key of whether the application can succeed. For example, if a user deposits $1000 in a smart card (for example, a prepaid card used in a shop) which uses a memory card as its storage medium and uses this smart card to make a payment, since the memory card is an independent circuit, the user can make a hard copy of the data in the memory card after the user determines the position of the memory card in the smart card. After the payment is made, the user can store the hard copy back into the memory card to refresh the value in the memory card. Thereby, how to protect the security of data in a flash memory is one of the most focused subjects in the industry.

SUMMARY

Accordingly, the present invention is directed to a flash memory storage system which can effectively ensure the reliability of the data stored therein.

The present invention is directed to a flash memory controller which can effectively ensure the reliability of the data stored in a flash memory chip.

The present invention is directed to a method for anti-falsifying data which can effectively ensure the reliability of the data stored in a flash memory chip.

The present invention provides a flash memory storage system. The flash memory storage system includes a controller and a flash memory chip. The flash memory chip stores at least one security data and at least one message digest. The controller is coupled to the flash memory chip and includes at least one non-volatile memory. The non-volatile memory stores at least one data token. The controller generates at least one eigenvalue corresponding to the security data. The message digest is generated by using a one-way hash function according to the data token and the eigenvalue. Further, when the security data is updated, the controller changes the data token and the eigenvalue and uses the one-way hash function to change the message digest according to the varied data token and eigenvalue. Further, when the security data stored in the flash memory chip is processed by the controller, the controller reads the data token, the eigenvalue, and the message digest, and generates at least one comparison message digest according to the read data token and eigenvalue. The controller then determines whether the read message digest is identical with the generated comparison message digest. When it is determined that the read message digest is different from the generated comparison message digest, the controller outputs a warning message.

The present invention further provides a controller, adapted for protecting at least one security data stored in a flash memory chip. The controller includes a microprocessor unit, a non-volatile memory, a data token processing unit, an eigenvalue processing unit, a message digest processing unit, and a flash memory interface module. The non-volatile memory is coupled to the microprocessor unit. The data token processing unit is coupled to the microprocessor unit, and is adapted for generating at least one data token corresponding to the security data and storing the data token in the non-volatile memory. The eigenvalue processing unit is coupled to the microprocessor unit, and is adapted for generating at least one eigenvalue corresponding to the security data. The message digest processing unit is coupled to the microprocessor unit, and is adapted for generating at least one message digest corresponding to the security data and storing the message digest in the flash memory chip. The message digest is generated by a one-way hash function according to the data token and the eigenvalue. The flash memory interface module is coupled to the microprocessor unit.

The present invention further provides a method for anti-falsifying data. The method for anti-falsifying data is adapted for protecting at least one security data stored in a flash memory chip of a flash memory storage system. The method for anti-falsifying data includes providing a non-volatile memory in a controller of the flash memory storage system, in which the non-volatile memory stores at least one data token corresponding to the security data. The method for anti-falsifying data further includes generating at least one eigenvalue and at least one message digest corresponding to the security data respectively. The message digest is generated by using a one-way hash function according to the data token and the eigenvalue. The method for anti-falsifying data further includes changing the data token and the eigenvalue and using the one-way hash function to change the message digest according to the varied data token and eigenvalue, when updating the security data. The method further includes reading the data token, the eigenvalue, and the message digest when processing the security data stored in the flash memory chip. The method also includes using the one-way hash function to generate a comparison message digest according to the read data token and eigenvalue, and determining whether the read message digest is identical with the generated comparison message digest, and outputting a warning message when it is determined that the read message digest is different from the generated comparison message digest.

In the present invention, the flash memory storage system stores a data token corresponding to the security data in a non-volatile memory, and stores an eigenvalue corresponding to the security data in the flash memory chip. Additionally, the flash memory storage system determines whether the security data has been falsified according to the data token and the eigenvalue when the security data stored in the flash memory chip is processed. In such a way, the flash memory storage system according to the present invention can ensures the reliability of the security data.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EXEMPLARY EMBODIMENTS

Figure 1:
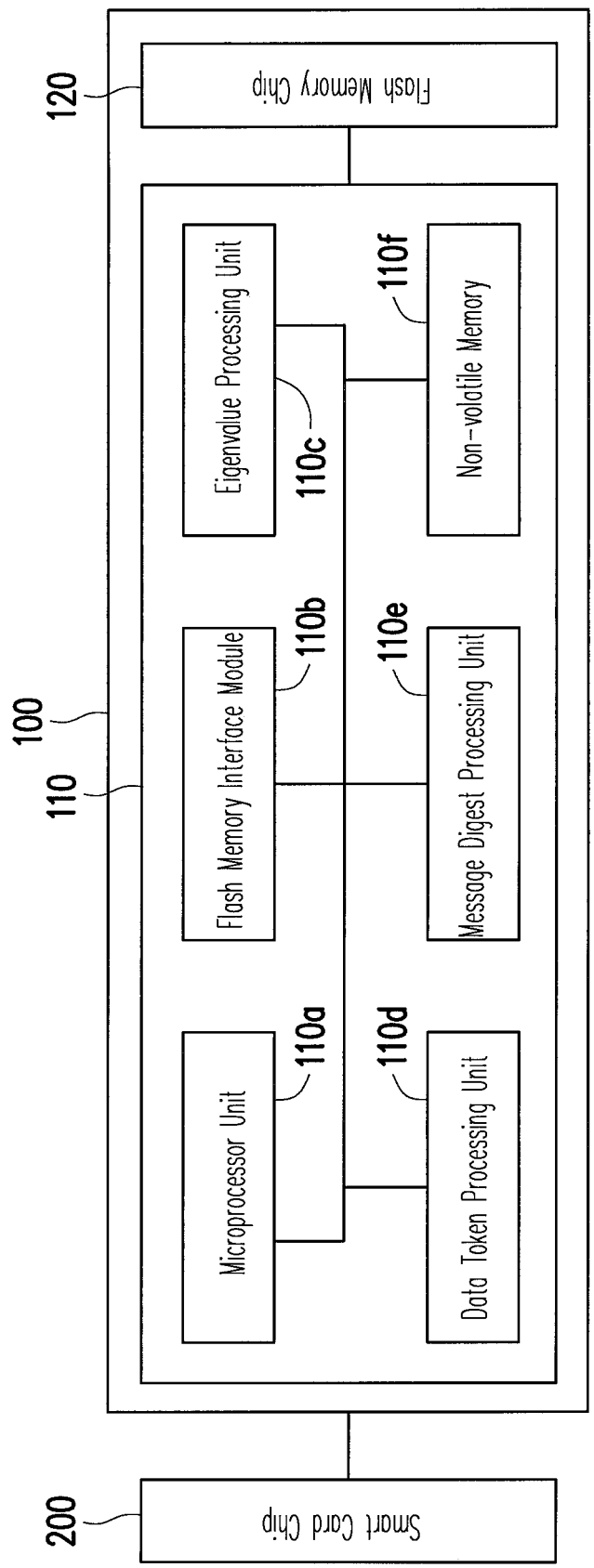
FIG. 1 is a schematic block diagram illustrating a flash memory storage system according to an exemplary embodiment of the present invention.

Reference will now be made in detail to the present preferred exemplary embodiments of the invention, examples of which are illustrated in the accompanying drawings. Wherever possible, the same reference numbers are used in the drawings and the description to refer to the same or like parts.

FIG. 1 is a schematic block diagram illustrating a flash memory storage system according to an exemplary embodiment of the present invention. Referring to FIG. 1, a flash memory storage system 100 includes a controller (also referred to as a controller system) 110, and a flash memory chip 120.

According to the exemplary embodiment of the present invention, the flash memory storage system 100 has a function of anti-falsifying data. As such, the flash memory storage system 100 is adapted for storing a security data required to be well protected. For example, in the current exemplary embodiment, the flash memory storage system 100 is provided as a storage medium for combining with a smart card for storing a security data of the smart card. The method of anti-falsifying data according to the exemplary embodiment will be later discussed in more details. In the current exemplary embodiment, the flash memory storage system 100 is preferably a small size memory card chip, and thus can be conveniently combined with a present smart card chip 200. However, in another exemplary embodiment of the present invention, the flash memory storage system 100 may also be a flash drive or a solid state drive (SSD) such that the security data of a user can be protected when the user uses the flash drive or SSD.

The controller 110 executes a plurality of logic gates or mechanical instructions in a hardware form or a firmware form, for executing data operations such as writing, reading and erasing data, to the flash memory chip 120. The controller 110 includes a microprocessor unit 110a, a flash memory interface module 110b, an eigenvalue processing unit 110c, a data token processing unit 110d, a message digest processing unit 110e, and a non-volatile memory 110f.

The microprocessor unit 110a collaborates with the flash memory interface module 110b, the eigenvalue processing unit 110c, the data token processing unit 110d, the message digest processing unit 110e, and the non-volatile memory 110f for executing different operations of the flash memory storage system 100. Specifically, in the current exemplary embodiment, when the smart card chip 200 which is combined with the flash memory storage system 100 accesses the security data stored in the flash memory chip 120, the microprocessor 110a determines whether the security data read from the flash memory chip 120 has been illegally falsified. When it is determined that the security data read from the flash memory chip 120 has been illegally falsified, a warning message is transmitted to the smart card chip 200 which is combined with the flash memory storage system 100 for informing that the read security data is unreliable. Thereby, the smart card chip 200 is prevented from using incorrect security data to execute related operations.

The flash memory interface module 110b is coupled to the microprocessor unit 110a for accessing the flash memory chip 120. In other words, data to be written into the flash memory chip 120 can be converted by the flash memory interface module 110b into a form accepted by the flash memory chip 120.

The eigenvalue processing unit 110c is coupled to the microprocessor unit 110a. In the current exemplary embodiment, the eigenvalue processing unit 110c is provided for storing and updating eigenvalues in blocks of the flash memory chip 120. In one exemplary embodiment, the eigenvalues are stored in a same block of the flash memory chip 120. Further, in another exemplary embodiment, the eigenvalues are dispersedly stored in a plurality of blocks of the flash memory chip 120.

Specifically, the eigenvalue is a random number value, which is a parameter required for generating the message digest or a message authentication code (MAC). Further, in another exemplary embodiment, the eigenvalue is a part or the entirety of security data stored in the flash memory storage system. Further, in still another exemplary embodiment of the present invention, the eigenvalue is stored in the controller 110. For example, the eigenvalue is stored in the non-volatile memory 110f the controller 110, or otherwise the controller 110 is provided with another non-volatile memory (not shown in the drawings) for storing the eigenvalue.

Specifically, when the security data has a quantity greater than a first threshold value or lower than a second threshold value, the eigenvalue processing unit 110c generates the eigenvalue corresponding to the security data. The first threshold value and the second threshold value may be set by the user as desired. In the exemplary embodiment, the first threshold value and the second threshold value are set as 1 MB (megabyte), and 32 bytes. However, it should be noted that the scope of the present invention is not restricted by the first threshold value and the second threshold value as given above.

In the exemplary embodiment, whenever the microprocessor unit 110a writes the security data into the flash memory chip 120 or updates the security data stored in the flash memory chip 120, the eigenvalue processing unit 110c generates a random number value for updating the eigenvalue corresponding to the security data. Then, when accessing the security data from the flash memory chip 120, the microprocessor unit 110a can execute a reliability verification of the security data according to the updated eigenvalue.

It should be emphasised that, the eigenvalue is a parameter required for generating the message digest, and a longer computation time for generating the message digest is required in correspondence with an eigenvalue having more bytes. Further, in another exemplary embodiment, the message digest generated corresponding to an eigenvalue having less bytes is more likely to be cracked. As such, typically, an eigenvalue having more bytes is often preferred. Therefore, in the exemplary embodiment, the eigenvalue is set to be but not restricted to be 32 bytes.

In the exemplary embodiment, the eigenvalue processing unit 110c generates an eigenvalue for verifying the security data stored in the flash memory chip 120. However, in another exemplary embodiment of the present invention, the eigenvalue processing unit 110c generates a plurality of eigenvalues for verifying the security data stored in the flash memory chip 120.

The data token processing unit 110d is coupled to the microprocessor unit 110a. In the exemplary embodiment, the data token processing unit 110d is configured for storing and updating a data token. Specifically, the data token is also a random number value, which is required together with the eigenvalue for generating the message digest. More specifically, the data token is stored in the non-volatile memory 110f. Whenever the microprocessor unit 110a writes the security data into the flash memory chip 120 or updates the security data stored in the flash memory chip 120, the data token processing unit 110d generates a random number value for updating the data token corresponding to the security data. Then, when accessing the security data from the flash memory chip 120, the microprocessor unit 110a can execute a reliability verification of the security data according to the updated data token.

It should be noted that in another exemplary embodiment, the data token processing unit 110d can alternatively generate numbers in accordance with a certain rule or in sequence, in which the numbers are taken as data tokens. For example, the data token processing unit 110d employs serial numbers, 1, 2, 3 . . . serving as the data tokens. Further, the data token processing unit 110d may also take a specific data (e.g. a processing time of the data) received by the microprocessor unit 110a as the data token thereof, or encode the specific data and take the encoded specific data as the data token thereof.

The message digest processing unit 110e is coupled to the microprocessor unit 110a. In the exemplary embodiment, the message digest processing unit 110e generates a message digest according to a message inputted therein by using a one-way hash function. Specifically, whenever the microprocessor unit 110a writes the security data into the flash memory chip 120 or updates the security data stored in the flash memory chip 120, the message digest processing unit 110e generates a corresponding message digest according to the eigenvalue generated or updated by the eigenvalue processing unit 110c and the data token generated or updated by the data token processing unit 110d. The message digest processing unit 110e then stores the generated message digest in the flash memory chip 120. After that, the microprocessor unit 110a can execute a reliability verification of the security data by accessing the message digest.

In the exemplary embodiment, SHA-256 is implemented as the one-way hash function employed by the message digest processing unit 110e. However, it should be noted that the one-way hash function is not restricted to be necessarily as such. In other exemplary embodiments, the one-way hash function can also be MD5, RIPEMD-160, SHA1, SHA-386, SHA-512, or other suitable functions.

It should be noted that, in the exemplary embodiment, the eigenvalue processing unit 110c, the data token processing unit 110d, and the message digest processing unit 110e are configured in a hardware form in the controller 110. However, in another exemplary embodiment, the eigenvalue processing unit 110c, the data token processing unit 110d, and the message digest processing unit 110e are configured in a firmware form in the controller 110. For example, mechanical instructions are drafted with a programming language and stored in a program memory, such as an accessed only memory (ROM), for implementing the eigenvalue processing unit 110c, the data token processing unit 110d, and the message digest processing unit 110e in the controller 110. When the flash memory storage system 100 is in operation, a plurality of mechanical instructions of the eigenvalue processing unit 110c, the data token processing unit 110d, and the message digest processing unit 110e will be indirectly loaded to a buffer memory (not shown in the drawings) of the controller 110, and executed by the microprocessor unit 110a. Or otherwise, the microprocessor unit 110a directly executes the mechanical instructions so as to complete the foregoing data protection procedure.

Further, according to another exemplary embodiment, the mechanical instructions of the eigenvalue processing unit 110c, the data token processing unit 110d, and the message digest processing unit 110e can be stored in a firmware form in a specific area (e.g. system blocks) of the flash memory chip 120. Similarly, when the flash memory storage system 100 is in operation, a plurality of mechanical instructions of the eigenvalue processing unit 110c, the data token processing unit 110d, and the message digest processing unit 110e will be indirectly loaded to a buffer memory (not shown in the drawings) of the controller 110, and executed by the microprocessor unit 110a.

The non-volatile memory 110f is coupled to the microprocessor unit 110a. In the exemplary embodiment, the non-volatile memory 110f is configured for storing the foregoing data token. As discussed above, the data token is used for combining with the written security data for serving as a parameter required by the message digest processing unit 110e for generating the message digest. Therefore, a length of the data token is not required to be very long. As such, the non-volatile memory 110f in the exemplary embodiment is exemplified with a rewritable non-volatile memory having a storage capacity of 16 bytes (or 36 bytes).

Even though not shown in the present exemplary embodiment, the controller 110 may further include other functional modules for controlling the flash memory chip, such as a buffer memory (for example, a static random access memory (SRAM)), an error correction module, and a power management module, etc.

Further, according to an exemplary embodiment, the flash memory storage system 100 is a flash drive or a solid state drive (SSD). The flash memory storage system 100 then further includes a connector (not shown in the drawings), for connecting the flash memory storage system 100 to a host system (e.g. a PC). Meanwhile, the controller 110 further includes a host interface module (not shown in the drawings) coupled to the microprocessor unit 110a, for receiving and identifying commands transmitted from the host system. In other words, in the exemplary embodiment that the flash memory storage system 100 is a flash drive or an SSD, the commands and data transmitted from the host system which is connected to the flash memory storage system 100 are transmitted to the microprocessor unit 110a via the connector and the host interface module. For example, the connector and the host interface module can be correspondingly a USB connector and a USB interface, a PCI Express connector and a PCI Express interface, an IEEE 1394 connector and an IEEE 1394 interface, a SD connector and a SD interface, a MS connector and a MS interface, a MMC connector and a MMC interface, a SATA connector and a SATA interface, a PATA connector and a PATA interface, a CF connector and a CF interface, an IDE connector and an IDE interface, respectively, or other suitable connectors and data transmission interfaces.

As such, in the flash memory storage system 100, when the microprocessor unit 110a writes or updates the security data in the flash memory chip 120, the eigenvalue processing unit 110c randomly generates a random number value corresponding to the updated security data for updating the eigenvalue stored in the flash memory chip 120. At the same time, the data token processing unit 110d also randomly generates a random number value corresponding to the updated security data for updating the data token stored in the rewritable non-volatile memory. Accordingly, the message digest processing unit 110e generates a message digest corresponding to the updated security data according to the updated eigenvalue and the updated data token, and stores or updates the message digest in the flash memory chip 120. Thereafter, in the flash memory storage system 100, when the microprocessor unit 110a accessing the security data from the flash memory chip 120, the microprocessor unit 110a reads the security data, the eigenvalue, and the message digest stored in the flash memory chip 120, and reads the data token stored in the non-volatile memory 110f. Meanwhile, the message digest processing unit 110e generates a comparison message digest according to the eigenvalue and the data token read by the microprocessor unit 110a. In such a way, the microprocessor unit 110a can determine whether the security data read from the flash memory chip 120 is reliable or not by comparing the calculated comparison message digest and the read message digest. A method for anti-falsifying data is to be discussed in details in accordance with preferred exemplary embodiments and corresponding drawings.

Figure 2:
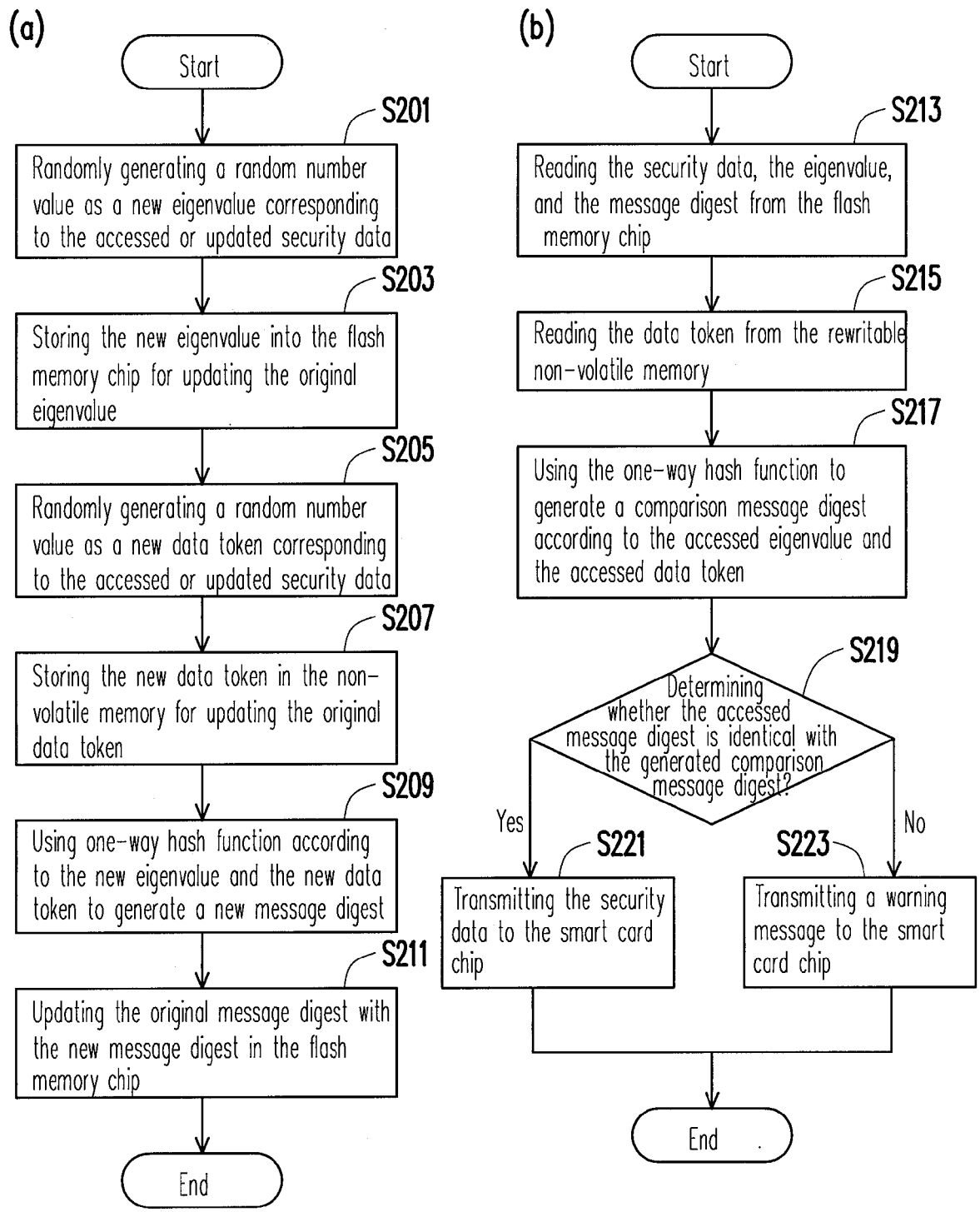
FIG. 2 is a flow chart illustrating a method for anti-falsifying data according to an exemplary embodiment of the present invention.
Figure 3:
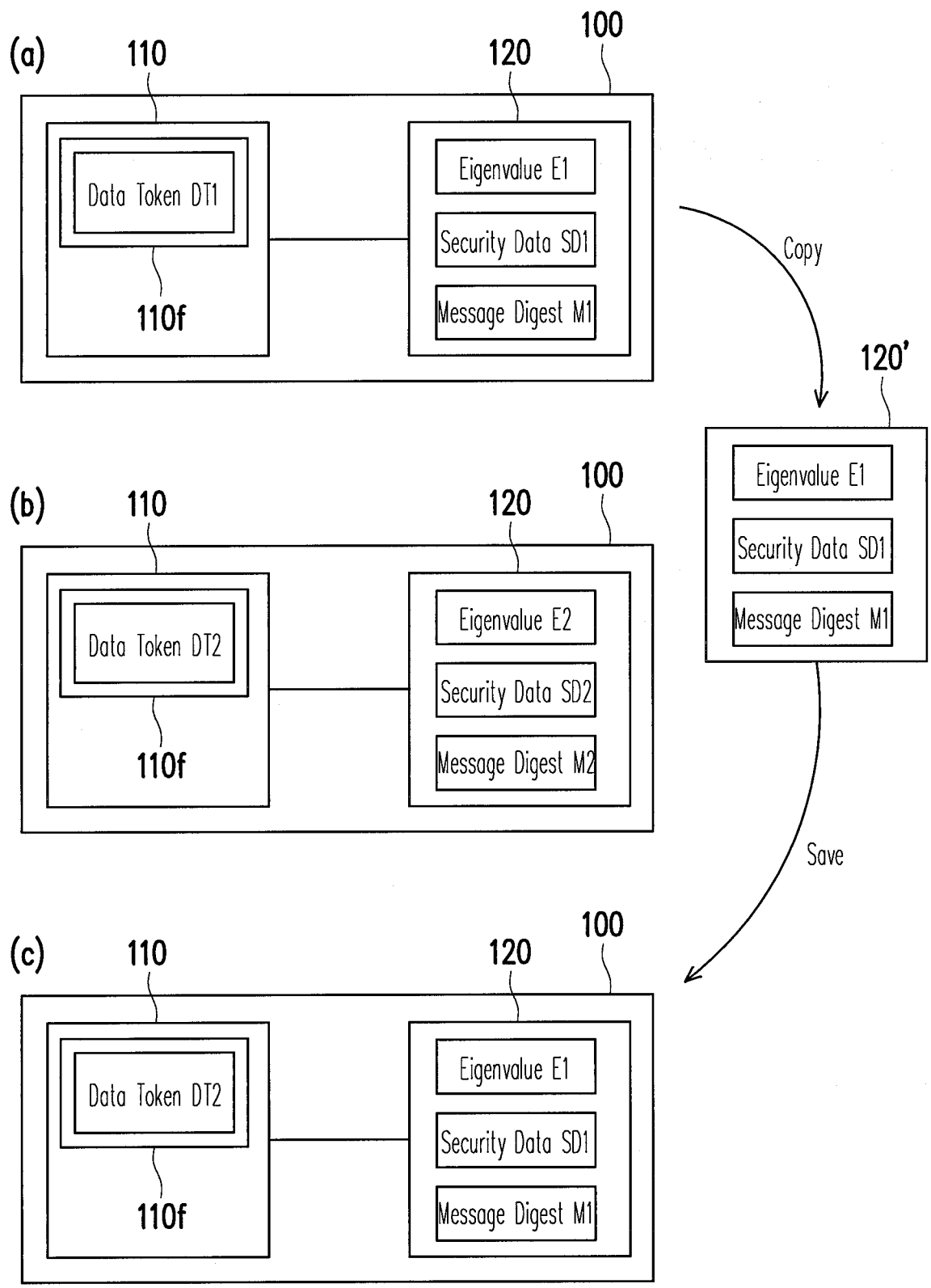
FIG. 3 is a schematic diagram illustrating the procedure of determining the reliability of the security data according to an exemplary embodiment of the present invention.

FIG. 2 is a flow chart illustrating a method for anti-falsifying data according to an exemplary embodiment of the present invention. FIG. 3 is a schematic diagram illustrating the procedure of determining the reliability of the security data according to an exemplary embodiment of the present invention.

Referring to FIG. 2(a) and FIG. 3(a), when a smart card chip 200 requests the controller 110 to write or update the security data (e.g. security data SD1 as shown in FIG. 3) in the flash memory chip 120 or a quantity of the security data to be written or updated is greater than a first threshold value or less than a second threshold value, the controller 110 randomly generates a random number value as a new eigenvalue corresponding to the written or updated security data (S201). And, the controller 110 stores the newly eigenvalue in the flash memory chip 120 for updating the original eigenvalue (e.g. the eigenvalue E1 as shown in FIG. 3) (S203).

Then, the controller 110 randomly generates a random number value as a new data token corresponding to the written or updated security data (S205), and stores the new data token in the non-volatile memory 110f for updating the original data token (e.g. the data token DT1 as shown in FIG. 3) (S207). Specifically, in the method for anti-falsifying data according to the exemplary embodiment, whenever the security data is written or updated, a different set of data tokens are randomly generated. In other words, the newly generated data token has a value distinct from that of the original data token.

Then, the controller 110 generates a new message digest according to the new eigenvalue and the new data token by using a one-way hash function (S209). Then, the original message digest in the flash memory chip 120 (e.g. the message digest M1 as shown in FIG. 3) is updated with the new message digest (S211).

Referring to FIG. 2(b), when the smart card chip 200 combined with the flash memory storage system 100 needs to access the previously stored security data (e.g. the security data SD1 as shown in FIG. 3), the controller 110 read the security data (e.g. the security data SD1 as shown in FIG. 3), the eigenvalue (e.g. the eigenvalue E1 as shown in FIG. 3), and the message digest (e.g. the message digest M1 as shown in FIG. 3) from the flash memory chip 120 (S213).

Then, the controller 110 read the data token (e.g. the data token DT1 as shown in FIG. 3) from the non-volatile memory 110f (S215).

After that, the controller 110 generates a comparison message digest according to the read eigenvalue and the read data token by the one-way hash function (S217), and it is determined whether the read message digest is identical with the generated comparison message digest (S219).

If, for example, it is determined that the read message digest is identical with the generated comparison message digest, then at step S221, the controller 110 transmits the security data to the smart card chip 200.

However, if it is determined that the read message digest is different from the generated comparison message digest at step S219, then at step S223, a warning message is transmitted to the smart chard chip 200 for notifying that the security data has been illegally falsified. For example, when smart cart chip 200 is about to read the security data SD1 as shown in FIG. 3(a), the comparison message digest generated according to the eigenvalue E1 and the data token DT1 will be identical with the read message digest M1. As such, according to the method for anti-falsifying data, the security data will be normally transmitted to the smart card chip 200.

Referring to FIG. 3(b), when the user pays by the smart card having the smart card chip 200 and the flash memory storage system 100, the controller 110 of the flash memory storage system 100 may execute the steps as shown in FIG. 2(a). Herein, the security data SD1 of the flash memory chip 120 is updated to a security data SD2, and a new eigenvalue E2, a new data token DT2 a new message digest M2 are generated to replace the eigenvalue E1 of the flash memory chip 120, the data token DT1 stored in the rewritable non-volatile memory, and the message digest M1 of the flash memory chip 120, respectively.

Referring to FIG. 3(c), if the user executes a hard copy to store the eigenvalue E1, the security data SD1, and the message digest M1 to a flash memory chip 120' before he pays (i.e. the steps as shown in FIG. 3(a)), and then stores the eigenvalue E1, the security data SD1, and the message digest M1 stored in the flash memory chip 120' back to the flash memory chip 120 after he pays, the eigenvalue E2, the security data SD2 and the message digest M2 stored in the flash memory chip 120 (i.e. the steps as shown in FIG. 3(b)) would be falsified back to the eigenvalue E1, the security data SD1, and the message digest M1 before the transaction.

Under the condition as shown in FIG. 3(c), when the smart card chip 200 is about to read the security data, the controller 110 of the flash memory storage system 100 executes the steps as shown in FIG. 2(b) to calculate the comparison message digest according to the eigenvalue E1 and the data token DT2. In this case, because the message digest M1 stored in the flash memory chip 120 is generated according to the eigenvalue E1 and the data token DT1, the comparison message digest calculated according to the eigenvalue E1 and the data token DT2 is different from the message digest M1. As such, according to the method for anti-falsifying data of the exemplary embodiment, a warning message is transmitted to the smart card chip 200, for notifying that the security data has been illegally falsified (e.g. the step S223 shown in FIG. 2(b)).

According to another exemplary embodiment, in order to avoid the possibility that the two data tokens (e.g. DT1 and DT2) occasionally happen to be identical, the step S205 shown FIG. 2(a) further includes regenerating a data token when the generated data token is identical with the original data token.

According to a further exemplary embodiment, the step S203 shown in FIG. 2(a) further includes storing the eigenvalue corresponding to the security data in a fixed block address. In other words, the controller 110 can read the eigenvalue from the fixed block address, so that the time used for searching for the eigenvalue can be reduced. In such a way, an access efficiency of accessing the flash memory storage system 100 can be improved.

It should be noted that in the exemplary embodiment that the eigenvalue processing unit 102c generates a plurality of eigenvalues of verifying the security data, in the step S203 of the foregoing method for anti-falsifying data, a part of or the entirety of the eigenvalues are updated. Further, in this case, in the step S209 of the foregoing method for anti-falsifying data, the new message digest is generated according to the part of or the entirety of the eigenvalues.

For example, in one exemplary embodiment that the eigenvalue processing unit 110c stores eigenvalues E1, E2, E3, E4, and E5 for serving as the parameters required for generating the message digest of the security data in the flash memory chip 120, when the microprocessor unit 110a updates the security data stored in the flash memory chip 120, the eigenvalue processing unit 110c updates all of the eigenvalues E1, E2, E3, E4, and E5, and the message digest processing unit 110e generates the message digest according to all of the eigenvalues E1, E2, E3, E4, and E5, as well as the data token updated by the data token processing unit 110d.

For example, in another exemplary embodiment that the eigenvalue processing unit 110c stores eigenvalues E1, E2, E3, E4, and E5 for serving as the parameters required for generating the message digest of the security data in the flash memory chip 120, when the microprocessor unit 110a updates the security data stored in the flash memory chip 120, the eigenvalue processing unit 110c updates all of the eigenvalues E1, E2, E3, E4, and E5, while the message digest processing unit 110e generates the message digest according to the eigenvalues E1, E3, and E5 only, and the data token updated by the data token processing unit 110d.

For example, in still another exemplary embodiment that the eigenvalue processing unit 110c stores eigenvalues E1, E2, E3, E4, and E5 for serving as the parameters required for generating the message digest of the security data in the flash memory chip 120, when the microprocessor unit 110a updates the security data stored in the flash memory chip 120, the eigenvalue processing unit 110c only updates the eigenvalues E2, and E4, while the message digest processing unit 110e generates the message digest according to all of the eigenvalues E1, E2, E3, E4, and E5, as well as the data token updated by the data token processing unit 110d.

For example, in a further exemplary embodiment that the eigenvalue processing unit 110c stores eigenvalues E1, E2, E3, E4, and E5 for serving as the parameters required for generating the message digest of the security data in the flash memory chip 120, when the microprocessor unit 110a updates the security data stored in the flash memory chip 120, the eigenvalue processing unit 110c only updates the eigenvalues E2, and E4, while the message digest processing unit 110e generates the message digest according to the eigenvalues E2, E3, and E4 only, and the data token updated by the data token processing unit 110d.

It should be noted that when only a part of the eigenvalues are updated or used for generating the message digest, the part of eigenvalues to be updated or used are selected in a random manner or selected in accordance with the value of the data token.

Further, the scope of the present invention should not be limited by the sequence of the steps illustrated in the exemplary embodiment shown in FIG. 2. People skilled in the art may conveniently modify the foregoing exemplary embodiment with a verified sequence of the same or similar steps to comply with the present invention.

As shown in FIG. 3, in the exemplary embodiment of the present invention, a set of security data, eigenvalue, data token and message digest are exemplified for illustration. However, the present invention is not limited as such. In another exemplary embodiment, when a plurality of security data are to be stored in the flash memory chip 120, the data token processing unit 110d, the eigenvalue processing unit 110c, and the message digest processing unit 110e can provide a set of data token, eigenvalue, and message digest for the plurality of security data, for executing the method for anti-falsifying data according to the exemplary embodiment. Further, in the exemplary embodiment that a plurality of security data are stored in the flash memory chip 120, the data token processing unit 110d, the eigenvalue processing unit 110c and the message digest processing unit 110e generates a plurality of corresponding sets of data tokens, eigenvalues, and message digests, for the plurality of security data, respectively. The data token processing unit 110d partitions the non-volatile memory 110f for storing the plurality of sets of data tokens, respectively, or configured a plurality of the non-volatile memories 110f in the controller to store a plurality of sets of data tokens.

In summary, the present invention employs a rewritable non-volatile memory in the controller of the flash memory storage system for saving a data token which is a random number value, and saves an eigenvalue which is also a random number value in the flash memory chip. In the present invention, a message digest is generated according to the updated data token and eigenvalue and is used for verifying the security data stored in the flash memory chip. As such, in case an unauthorized user recovering the security data stored in the flash memory chip by hard copy, the controller can determines whether the security data has been falsified according to the comparison message digest generated by calculating according to the data token and eigenvalue. In such a way, the reliability of the security data stored in the flash memory storage system can be effectively maintained. Therefore, the present invention can be applied in the combination of the flash memory and the smart card for effectively protecting the security data. Further, the eigenvalue can be fixedly stored by the controller in a specific block address. As such, when a verification is required for accessing the security data, the time for searching for the eigenvalue can be reduced, thus improving the efficiency of the flash memory storage system. Furthermore, the eigenvalue can be designed in accordance with the amount of the specific data expected by the system designer, and therefore comparing with directly encoding the large amount of security data, the present invention saves the time required by the one-way hash function for calculating the message digest.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A flash memory storage system, comprising:
a flash memory chip, for storing at least one security data, and at least one message digest; and
a controller, coupled to the flash memory chip and comprising at least one non-volatile memory,
wherein the controller is configured to receive at least one security data from a smart card chip and store the at least one security data in the flash memory chip,
wherein the controller is further configured to generate at least one data token corresponding to the at least one security data and store the at least one data token in the at least one non-volatile memory,
wherein the controller is further configured to generate at least one eigenvalue corresponding to the at least one security data and store the at least one eigenvalue in the flash memory chip,
wherein the controller is further configured to use a one-way hash function to generate at least one message digest according to the at least one data token and the at least one eigenvalue and store the at least one message digest in the flash memory chip,
wherein when the at least one security data is updated by the smart card chip, the controller changes the at least one data token and the at least one eigenvalue, and uses the one-way hash function to change the at least one message digest according to the changed at least one data token and the changed at least one eigenvalue; and
when the controller processes the at least one security data stored in the flash memory chip, the controller reads the at least one data token, the at least one eigenvalue, and the at least one message digest, and generates at least one comparison message digest according to the read at least one data token and the read at least one eigenvalue, and determines whether the read at least one message digest is identical with the generated at least one comparison message digest, wherein when it is determined that the read at least one message digest is different from the generated at least one comparison message digest, the controller outputs a warning message.

2. The flash memory storage system according to claim 1, wherein the controller generates the at least one message digest according to a part of or the entirety of the at least one eigenvalue and the at least one data token.

3. The flash memory storage system according to claim 1, wherein when the controller updates the at least one security data, the controller changes a part of or the entirety of the at least one eigenvalue.

4. A flash memory controller, for protecting at least one security data stored in a flash memory chip, the controller comprising:

a microprocessor unit, configured to receive at least one security data from a smart card chip and store the at least one security data in the flash memory chip;
at least one non-volatile memory, coupled to the microprocessor unit;
a data token processing unit, coupled to the microprocessor unit, and configured to generate at least one data token corresponding to the at least one security data and storing the at least one data token in the at least one non-volatile memory;
an eigenvalue processing unit, coupled to the microprocessor unit, and configured to generate at least one eigenvalue corresponding to the at least one security data and store the at least one eigenvalue in the flash memory chip,
a message digest processing unit, coupled to the microprocessor unit, and configured to use a one-way hash function to generate at least one message digest corresponding to the at least one security data according to the at least one data token and the at least one eigenvalue and store the at least one message digest in the flash memory chip; and
a flash memory interface module, coupled to the microprocessor unit;
wherein when the microprocessor unit updates the at least one security data, the data token processing unit changes the at least one data token, the eigenvalue processing unit changes the at least one eigenvalue, and the message digest processing unit changes the at least one message digest by using the one-way hash function according to the changed at least one data token and the changed at least one eigenvalue, and
when the microprocessor unit processes the security data stored in the flash memory chip, the microprocessor unit reads the at least one data token, the at least one eigenvalue, and the at least one message digest, and the message digest processing unit uses the one-way hash function to generate at least one comparison message digest according to the read at least one data token and the read at least one eigenvalue, and the microprocessor unit determines whether the read at least one message digest is identical with the generated at least one comparison message digest, wherein when it is determined that the read at least one message digest is different from the generated at least one comparison message digest, the microprocessor unit outputs a warning message.

5. The flash memory controller according to claim 4, wherein the eigenvalue processing unit stores the at least one eigenvalue in at least one block of the flash memory chip or in the at least one non-volatile memory.

6. The flash memory controller according to claim 4, further comprises an additional non-volatile memory, wherein the eigenvalue processing unit stores the at least one eigenvalue in the additional non-volatile memory.

7. The flash memory controller according to claim 4, wherein the message digest processing unit generates the at least one message digest according to the at least one data token and a nary of or the entirety of the at least one eigenvalue.

8. The flash memory controller according to claim 4, wherein when the microprocessor unit updates the at least one security data, the eigenvalue processing unit changes a part of or the entirety of the at least one eigenvalue.

9. The flash memory controller according to claim 4, wherein when the microprocessor unit updates the at least one security data, the data token processing unit randomly generates at least one random number value as the at least one data token.

10. The flash memory controller according to claim 4, wherein when the microprocessor unit updates the at least one security data, the eigenvalue processing unit randomly generates at least one random number value as the at least one eigenvalue.

11. The flash memory controller according to claim 6, wherein each of the at least one non-volatile memory unit is a rewritable non-volatile memory.

12. A method for anti-falsifying data, for protecting at least one security data stored in a flash memory chip of a flash memory storage system, wherein the flash memory storage system has a controller and the controller has at least one non-volatile memory, the method for anti-falsifying data comprising:

receiving at least one security data from a smart card chip and store the at least one security data in the flash memory chip;

generating at least one data token corresponding to the at least one security data and storing the at least one data token corresponding to the at least one security data in at least one non-volatile memory in a controller of the flash memory storage system;

generating at least one eigenvalue corresponding to the at least one security data and storing the at least one eigenvalue in the flash memory chip;

using a one-way hash function to generate at least one message digest corresponding to the security data according to the at least one data token and the at least one eigenvalue and storing the at least one message digest in the flash memory chip;

changing the at least one data token and the at least one eigenvalue and changing the message digest according to the changed at least one data token and the changed at least one eigenvalue by using the one-way hash function, when the smart card chip updates the at least one security data;

reading the at least one data token, the at least one eigenvalue, and the at least one message digest, and generating at least one comparison message digest according to the read at least one data token and the read at least one eigenvalue by using the one-way hash function, and determining whether the read at least one message digest is identical with the generated at least one comparison message digest, when processing the at least one security data stored in the flash memory chip; and outputting a warning message, when it is determined that the read at least one message digest is different from the generated at least one comparison message digest.

13. The method for anti-falsifying data according to claim 12, wherein a quantity of the at least one security data is greater than a first threshold value and less than a second threshold value.

14. The method for anti-falsifying data according to claim 12, further comprising storing the at least one eigenvalue in at least one block of the flash memory chip or in the controller.

15. The method for anti-falsifying data according to claim 12, wherein the step of using a one-way hash function to generate the at least one message digest according to the at least one data token and the at least one eigenvalue further comprises generating the at least one message digest according to the at least one data token and a part of or the entirety of the at least one eigenvalue.

16. The method for anti-falsifying data according to claim 12, wherein the step of changing the at least one eigenvalue comprise changing a part of or the entirety of the at least one eigenvalue.

17. The method for anti-falsifying data according to claim 12, wherein the step of changing the at least one data token and the at least one eigenvalue comprises randomly generating a plurality of random number values as the at least one data token and the at least one eigenvalue.

18. The method for anti-falsifying data according to claim 12, wherein the at least one eigenvalue is a part or the entirety of the at least one security data.

19. The method for anti-falsifying data according to claim 12, wherein the one-way hash function comprises MD5, RIP-EMD-160, SHA1, SHA-256, SHA-386, or SHA-512.

20. The method for anti-falsifying data according to claim 12, wherein each of the at least one non-volatile memory is a rewritable non-volatile memory.

* * * * *